A. E. DOLBEAR.
Combined Telephone and Electro-Magnet.

No. 226,906. Patented April 27, 1880.

Witnesses:

Inventor:
A. E. Dolbear

United States Patent Office.

AMOS E. DOLBEAR, OF SOMERVILLE, MASSACHUSETTS.

COMBINED TELEPHONE AND ELECTRO-MAGNET.

SPECIFICATION forming part of Letters Patent No. 226,906, dated April 27, 1880.

Application filed January 24, 1880.

*To all whom it may concern:*

Be it known that I, AMOS E. DOLBEAR, of Somerville, in the county of Middlesex and State of Massachusetts, have invented a new Electro-Magnetic Telephone, of which the following is a full, clear, concise, and exact description, reference being had to the accompanying drawings, making a part hereof.

Figure 1:
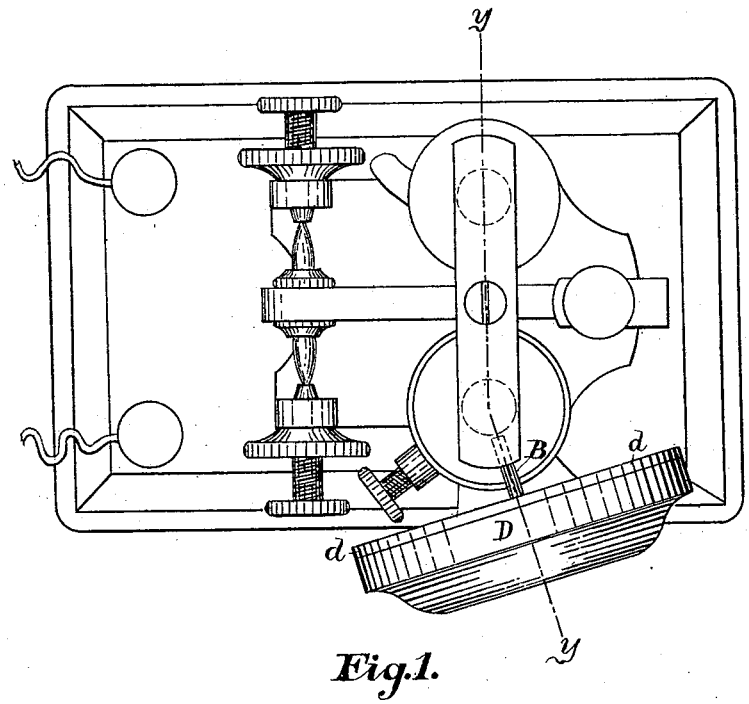
Figure 2:
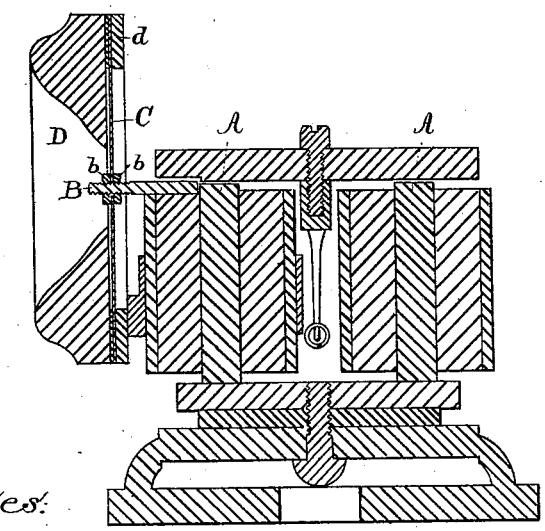

In the drawings, Figure 1 is a plan of an ordinary sounder with my telephonic receiver attached. Fig. 2 is a section on line $y\,y$ of Fig. 1.

I have discovered that if a small rod of iron or steel (preferably soft iron) be connected to a diaphragm and the whole be mounted, as shown in the drawings, in relation to an electro-magnet the rod will move toward and from the magnet so as to vibrate the diaphragm when varying currents of electricity are sent through the coil of the magnet, or, in other words, that such a contrivance will make an excellent telephonic receiver well adapted for use with any of the ordinary transmitters.

In the drawings, A is an electro-magnet; B, a small rod of soft iron; C, a diaphragm, and D a frame, over which the diaphragm is secured by the ring $d$, or in any other proper way. The rod B is connected to the diaphragm C by means of the two nuts $b\,b$, in order that the position of the rod B may be very accurately adjusted. The frame D is so mounted that the end of the rod B can be brought into contact with the pole of the magnet, as shown in the drawings.

The diaphragm C is best made of a thin sheet of mica, and the rod B should be adjusted so that when its end touches the pole of the magnet the diaphragm is under a slight strain. The best adjustment is readily found.

In operation the motion of the rod B is not visible, and it remains apparently always in contact with the pole of the magnet; but it must, of course, vibrate lengthwise in order to vibrate the diaphragm.

The attachment of this device does not interfere at all with the use of the sounder for other purposes; and it may be applied to any instrument containing an electro-magnet.

What I claim as my invention is—

The combination of the diaphragm C and electro-magnet A by means of the rod B, substantially as described.

A. E. DOLBEAR.

Witnesses:
    F. M. HOLMES,
    J. E. MAYNADIER.